United States Patent Office 3,661,801
Patented May 9, 1972

3,661,801
SOLID PHOSPHORIC ACID CATALYSTS
William R. Gutmann and Edward K. Dienes, Louisville, Ky., assignors to Catalysts and Chemicals Inc., Louisville, Ky.
No Drawing. Filed Feb. 2, 1970, Ser. No. 8,025
Int. Cl. B01j *11/82*
U.S. Cl. 252—435   5 Claims

ABSTRACT OF THE DISCLOSURE

Solid phosphoric acid is the name which has come into use for a calcined mixture of an acid of phosphorous and a porous siliceous material. Solid phosphoric acid catalysts have for years been virtually the only catalyst effective in many reactions involving olefins, particularly the polymerization of olefins to form high octane fuels. These catalysts are widely used despite their lack of strength and poor wearing qualities. High strength solid phosphoric acid catalysts are provided herein, the uniqueness of the catalyst being attributable to the method of preparation. $P_2O_5$ is dry blended with the silica material to form the precursor. The precursor is then subjected to a steam-air treatment to bring about the hydration of the $P_2O_5$. This forms a silico-phosphorous matrix. This matrix is preserved by not physically changing the catalyst during its preparation. This is accomplished by forming spheres of the catalyst material by tumbling and spraying the tumbing mass with phosphoric acid.

BACKGROUND OF THE INVENTION

This invention relates to solid phosphoric acid catalysts bling mass with phosphoric acid.

Solid phosphoric acid is the name which has come into use for a calcined mixture of an acid of phosphorous and a porous siliceous material such as kieselguhr, infusorial earth and diatomaceous earth. Solid phosphoric acid catalysts for years have been virtually the only catalysts effective in the polymerization of normally gaseous olefins to form normally liquid hydrocarbons. Mixtures of propane and propylene, butane and butylene, and ethane and ethylene are the chief feed stocks to the polymerization process. These gas mixtures, containing olefinic hydrocarbons, are encountered in many commercial processes, for example in the cracking of petroleum, in gas making processes and as by-products in various chemical industries. The polymerization process contemplated herein is particularly directed to the production of dimers and trimers from monoolefins, and especially dimers and trimers boiling in the motor fuel range. These compounds have unusually high anti-knock characteristics.

As pointed out in such patents as 3,050,472, catalysts produced from mixtures of phosphoric acid and the porous silica material, after calcining, have proved to be the best available catalysts for the polymerization of gaseous olefins to produce liquid hydrocarbon components of high octane fuels. The polymerization process has been carried out for many years, but solid phosphoric catalysts are still preferred for use in the conversion of these otherwise practically waste gases. The catalyst itself is highly active for the purpose, but it has one chief disadvantage, namely, weak strength properties. Because of its lack of strength the catalyst has poor wearing qualities and a tendency to crumble and to dust during handling and use. This results in a relatively short life and frequent replacement of catalyst with the attendant increased costs. Despite the many years that this problem has existed, and many attempts to solve it, no completely satisfactory solution has been found. There is still a need to improve the catalyst with respect to both its initial strength and its retention of this strength during use.

SUMMARY OF THE INVENTION

According to the practice of this invention solid phosphoric acid catalysts are provided having strengths before and after use exceeding those of catalysts now known. In addition use of the catalysts of the invention results in somewhat higher conversions. The catalysts contemplated herein are in the form of ⅛ to ½ inch spheres having a total volume of pores with diameters greater than 350 angstroms of 0.200 to 0.400 cc. per gram, surface areas of 1 to 15 square meters per gram, a volume of pores in the range having diameters greater than 9000 angstroms of 0.07 to 0.20 cc. per gram, densities of 30 to 60 pounds per cubic foot and initial crush strengths as great as 35 pounds dead weight load or greater.

The properties of the catalyst of this invention can be traced to the process by which the catalyst is made. The kieselguhr, infusorial earth or diatomaceous earth is dry mixed with $P_2O_5$. Spheres of this material are then made by tumbling, and spraying the tumbling mass with phosphoric acid. A catalyst precursor containing $P_2O_5$ is thus obtained. The uniqueness of this catalyst is believed attributable to the method of forming the precursor and the treatment which follows. The dried precursor is subjected to a steam-air atmosphere to bring its temperature to 400° F. to 750° F. and treated at this temperature until the $P_2O_5$, in the precursor, is hydrated. The disappearance of the $P_2O_5$ by hydration to form an acid of phosphorous using the steam present, and the heat treatment with air present strengthens the catalyst and creates the large diameter pores that appear to be necessary for the size molecules encountered in the polymerization reaction.

DETAILED DESCRIPTION OF THE INVENTION

As set forth in such patents as 2,116,151, 3,112,350, 3,050,473, and 3,132,109, heretofore solid phosphoric acid catalysts have been prepared by mixing the porous silica material with phosphoric acid, or phosphoric acid having $P_2O_5$ dissolved in it. Various types of mixes have been employed and a wet mass has been produced. The wet mass has been extruded, or partially dried and tablets formed in a machine suitable for the purpose. The tablets or extrusions are then dried and calcined. If dehydration is found to have taken place, the catalyst particles are treated with steam, since the polymerizing effectiveness of the catalyst is reduced by extensive dehydration.

In the preparation of the catalyst of this invention the $P_2O_5$ is dry blended with the porous silica material rather than dissolved in the phosphoric acid. Then, by tumbling seeds of larger particles of the blend, or of rework, i.e., ground particles of finished catalysts which were broken during preparation, in the dry blend with accompanying introduction of a spray of phosphoric acid catalyst pellets, spheres or spheroids are formed.

Various pelletizing machines are known, those preferred herein being disc pelletizers of the type described in 3,030,657 and 2,889,576. The pelletizing process employed herein is described in Ceramic Age, December 1966 at p. 24 et seq. In forming the pellets by whatever pelletizing means are employed the dry blend of $P_2O_5$ with kieselguhr, diatomaceous earth, or infusorial earth is sprayed during tumbling with concentrated phosphoric acid. The phosphoric acid should have a $P_2O_5$ content of about 70 to 115 weight percent. A desirable acid is phospholeum. The concentration and quantity of phosphoric acid sprayed on the tumbling mass is dependent to a large extent on the quantity of the acid of phosphorous desired in the finished catalyst. With the understanding that the dry blend must contain 30 to 60 weight percent $P_2O_5$ based on the blend in order, during the steam and air heat treatment, to aid in conferring the proper pore size distribution on the catalyst the quantity of phosphoric acid used will depend upon the level desired in the finished catalyst. The amount employed will also depend upon the strength of the acid. These three factors will be adjusted within their ranges for proper disc pelletizing. Generally a blend of 30 to 60, preferably 35 to 45 weight percent $P_2O_5$ with 40 to 70 weight percent porous silica material is fed to the rotating disc and sprayed with an amount of phosphoric acid of from 75 to 115 weight percent, preferably 105 percent, based on the tumbling mass. In the finished catalyst the matrix of the kieselguhr or other siliceous material should be modified by the presence of 60 to 85 weight percent of the acid of phosphorous.

After the spheres of catalyst precursor are formed on the disc pelletizer, they are dried. Generally a temperature below 800° F. is employed, say 400° F. to 800° F., desirably 700° F. This drying step results in a hard silico-phosphate matrix whose hardness and pore structure are further improved by the subsequent heat treatment using steam and air. Normally the spheres are dried for a period of one to three hours. However, the drying time will obviously depend upon the bed depth, quantity of spheres and the like.

Following the drying stage the spheres are further strengthened and the precursor is converted to the catalyst by a heat treatment using steam followed by air or a mixture of the two. Since it is faster, treatment using a mixture of air and steam is preferred. The composition of the mixture is not critical but rather fixes the length of the heating period. There must be sufficient contact of steam with the catalyst precursor to bring about the hydration of $P_2O_5$ in the dry blend to form one of the acids of phosphorous. Preferably the catalyst precursor is treated with steam until an appreciable amount of ortho-silico-phosphate is formed, the balance being pyro-silico-phosphate analyzing about 80 percent total acid, as phosphoric acid. It is obvious that if steam is present in the stream in an amount of 5 to 10 percent by volume a longer treating period will be needed. Accordingly 10 to 70 volume percent steam in air will normally be used.

In addition to forming the acid-silicate, deemed necessary for catalyst activity, the steam-air reaction removes the $P_2O_5$ particles from the matrix or crystalline structure. This $P_2O_5$ removal creates the desired large pores in a range of pore sizes required for the polymerization reactions involved. Steam-air treating studies indicate that variations in flow velocities produce changes in pore volume, and even more important, similar changes in pore size distribution. With treating temperatures of 500° F. to 700° F. this velocity should be 60 to 100 feet per minute. This process results in a catalyst formed from the precursor having a total volume of pores with diameters greater than 350 angstroms of 0.200 to 0.400 cc. per gram, with a volume of 0.07 to 0.20 cc. per gram of pores having diameters greater than 9000 angstroms. The surface area of the catalyst is generally 3 to 6.

Heat treating with steam followed by air or with a mixture of the two should be accomplished at a temperature sufficiently low so that it does not disrupt the silico-phosphorous matrix. A desirable temperature range is 400° F. to 750° F. This heat treatment accompanying or following the hydration of $P_2O_5$ appears to stabilize the modified matrix. In any event the strength of the catalyst is increased thereby. It is also believed that the increased strength of the catalyst of this invention is enhanced by not mechanically disrupting the silico-phosphorous matrix during the catalyst preparation. The formation of spheres does not physically change the resulting matrix. Previously solid phosphoric acid catalysts were made by mixing the diatomaceous earth or other clay with phosphoric acid to form a mass from which catalyst particles were formed by extruding or tabletting. This apparently mechanically alters the silico-phosphorous matrix, since subsequent heating of these particles does not result in a catalyst with strength properties equaling those of the catalysts of this invention wherein the matrix is unaltered either mechanically or by the heat treatment. The steam and air heat treatment is continued until the strength properties maximize. Again it can be seen that the period of treatment will depend upon the quantity of precursor being treated, bed depth, precursor temperature, air-steam ratio, and the like. However generally a period of 1 to 3 hours is sufficient when a mixture of equal volumes of steam and air are used.

The following examples will illustrate the process for the preparation of the catalyst prepared according to this invention as well as the strength properties and pore characteristics of the catalysts of the invention. It is understood, of course, that exact details set forth are not to be construed as imposing undue limitations upon the broader scope of the invention.

EXAMPLE 1

Using a dry materials mixer a dry blend of 57.2 pounds of kieselguhr and 42.8 pounds of phosphorous pentoxide was prepared. Following the procedure described in Ceramic Age, December 1966, at p. 25, a small quantity of this dry blend was fed to a pelletizing disc having an 8 inch rim. The disc was operated at an angle of 40° from the horizontal, rotated at 20 r.p.m. and the blend was sprayed with a fine spray of phospholeum to form small seed particles. As a bed of seeds formed, measured quantities of the dry blend and equal amounts of phospholeum were added to the rotating disc until 100 pounds of the dry mix and 100 pounds of phospholeum were added, with seeds growing during the process until they were ejected from the disc as product. The spherical pellets thus formed were first dried in a dry air atmosphere at a temperature of about 675° F. The dried pellets were then heated in a mixture of 80 percent air and 20 percent steam at 600° F. to form the finished catalyst, the air velocity being 85 cu. ft. per minute. Analytical results were as follows: Phosphoric acid content—73%; total volume of pores with diameters greater than 350 angstroms—0.306 cc. per gram; volume of pores with diameters greater than 9000 angstroms—0.085 cc. per gram; surface area—3 sq. meters per gram.

EXAMPLE 2

Following the procedure of Example 1, 100 pounds of a dry blend was made by mixing 47 pounds of kieselguhr, 35.4 pounds of phosphorous pentoxide and 17.6 pounds of rework, rework being oversized catalyst from previous production, ground so that at least 98 percent passes through a No. 100 U.S. standard sieve. Pellets or spheres of the blend were made and these were dried and steam treated to form the finished catalyst according to Example 1. Analytical results were as follows: Phosphoric acid content—73%; volume of pores with diameters greater than 350 angstroms—0.258 cc. per gram; volume of pores with diameters greater than 9000 angstroms—0.120 cc. per gram; surface area—3 sq. meters per gram.

It has been emphasized that the catalysts of this invention are less subject to attrition during use than those now known. In addition the catalysts are somewhat more active than those prepared by such patents as 2,102,073, 2,116,151 and 2,120,723. This will be apparent from the following data obtained by polymerizing a mixture of propylene and butylenes containing propanes and butanes.

TABLE 1

| Reaction conditions | | Catalyst |
|---|---|---|
| Temperature | {In 313° F | A Example 2. |
| | Out 421° F | B commercial. |
| Feed rate, barrels per day. | 495 | |
| Pressure | 1,010 p.s.i.g | |
| Feed gas | 44% olefins (unsaturated $C_3$ and $C_4$), balance propanes and butanes. | |
| Inlet $H_2O$ level | 0.11 mol percent | |

| Catalyst | Days on stream | Hydrocarbon feed, rate barrels per day | Catalyst life gallon polymer per pound | Yield gallon polymer per barrel feed | Pressure drop[1] at— | |
|---|---|---|---|---|---|---|
| | | | | | Start of run, p.s.i.g. | End of run, p.s.i.g. |
| A | 43 | 550 | 116.29 | 31.4 | 15 | 15 |
| B | 47 | 487 | 112.63 | 29.6 | 15 | 65 |

[1] Pressure drop through the bed of catalyst in this downflow type of reactor.

Catalyst life and yield are in terms of gallons of polymer formed.

Another comparison is given from a different installation, made when each charge of catalyst had been on stream 115 days. These charges of catalyst continued to be used giving similar performance.

TABLE 2

| Reaction conditions | | Catalyst |
|---|---|---|
| Feed rate, gallons per hour per pound of catalyst. | 0.211 | {A Example 2. B Commercial. |
| Pressure | 500 p.s.i.g | |
| Feed gas | 25% butylenes; 75% normal and isobutanes. | |
| Inlet $H_2O$ level | 0.21 mol percent | |

| Catalyst | Reactor temperature, ° F. | | | | Conversion, percent | | Yield[1] gal./lbs. of catalyst |
|---|---|---|---|---|---|---|---|
| | Initial | | 115th day | | | 115th day | |
| | In | Out | In | Out | Initial | | |
| A | 350 | 400 | 360 | 400 | 94 | 85.0 | 117 |
| B | 375 | 405 | 378 | 404 | 92.4 | 80.2 | 104 |

[1] Total gallons of liquid product produced in 115 days divided by the pounds of catalyst charged to the reactor.

It can be seen that the catalyst of this invention compares very favorably with a highly commercial olefin polymerization catalyst. There is no increase in pressure drop after 115 days of operation and the catalyst of this invention performed as long as the commercial catalyst. It was generally somewhat more active than the widely used catalyst as is indicated by the superior yields and conversions.

Solid phosphoric acid catalysts are suitable for the polymerization of any of the normally gaseous olefins. The temperature conditions for polymerization are preferably between about 300° F. and about 575° F. although somewhat higher temperatures up to about 750° F. may also be employed. The temperature should not be so high, however, as to dehydrate the catalyst substantially to the meta form. Water vapor must also be employed in the reaction to prevent such dehydration of the catalyst but the amount of water vapor should not be so high as to cause hydration of the olefins to dominate the polymerization reaction. Water contents of the inlet gas stream of 0.01 percent to about 1.0 percent, preferably 0.05 to 0.10 percent, are suitable. It is in this type of polymerization reaction that the catalyst preparation method according to the present invention is particularly advantageous inasmuch as the presence of this 0.01 percent to 1.0 percent water vapor in the feed has no destructive effect on the physical characteristics of the catalyst. Pressure conditions for polymerization may be in approximately the same range or slightly lower range than for the hydration reaction such as about 1 atmosphere to about 150 atmospheres and preferably above about 10 atmospheres. The catalysts of this invention have been found to withstand better than similar catalysts the forces of attrition to which they are subjected before and during the reaction. This will be apparent from the following comparative data obtained under the conditions set forth in Table 3.

TABLE 3

| Reaction conditions | | Catalyst |
|---|---|---|
| Temperature | 360° F | {A Example 2. B Commercial |
| Space velocity (liquid) | 0.43 feed vol./cat. vol./hr | |
| Pressure | 500 p.s.i.g | |
| Feed gas | 65% propylene-35% propane (approximately). | |
| Inlet $H_2O$ | 0.10 mol percent | |

| Catalyst | Hours on stream | Percent conversion last four hours on stream | Crush strength, pounds | |
|---|---|---|---|---|
| | | | Before use | After use |
| A | 144 | 61.6 | 38 | 28.8 |
| B | 144 | 58.8 | 27 | 18.8 |
| A | 246 | 60.3 | 42 | 34.2 |
| B | 246 | 57.4 | 28.6 | 18.9 |

It can be seen that the catalysts of this invention are not only highly superior to the best known catalyst in strength properties, but they are also slightly superior in promoting the polymerization reaction. The pore structure resulting from the use of $P_2O_5$ in dry form and the other steps employed in the catalyst preparation thus result in the production of an improved solid phosphoric acid catalyst. This can be further exemplified by comparing, with the catalysts of this invention, solid phosphoric acid catalysts which are deficient in large pores. In other words the volumes of pores of these catalysts with diameters greater than 9000 angstroms are below the desired 0.07 cc. per gram level. The two compositions (X and Y) were made following Example 2 and using rework as in that example, but air-steam treating conditions set forth in the table were used which did not result in the development of large pores.

TABLE 4

| Catalyst | Air-steam heat treatment | | | | Catalyst properties | | | |
|---|---|---|---|---|---|---|---|---|
| | Time, hour | Temperature, ° F. | Air flow, ft./min. | $H_2O$, percent | Pore volume, cc./g. | | Acid activity | |
| | | | | | M[1] | N[2] | Percent | At 360° F. |
| X | 1 | 600 | 43 | 20 | 0.242 | 0.036 | 73 | Gas conversion <50% at end of 54 hours. |
| Y | 1 | 700 | 43 | 20 | 0.250 | 0.063 | 75 | Do. |
| Example 1 | 1 | 600 | 85 | 20 | 0.306 | 0.085 | 71 | Gas conversion >60% after 148+ hours. |
| Example 2 | 1 | 700 | 85 | | 0.258 | 0.120 | 69 | Gas conversion 58% after 710+ hours. |

[1] Volume of pores having diameters greater than 350 A.
[2] Volume of pores having diameters greater than 9,000 A.

As can be seen each of the catalysts have a volume of pores with diameters greater than 350 angstroms within the desired range. Nevertheless with catalysts X and Y conversions dropped to below 50 percent in about 54 hours. With the catalysts of the invention far superior results were obtained.

This invention thus provides a solid phosphoric acid catalyst superior in physical properties to the most successful prior art solid phosphoric acid catalyst and yet equivalent in its catalytic properties. The catalyst provided herein, like known solid phosphoric acid catalysts, is suitable not only for the production of high octane fuels but for other reactions involving olefins such as the production of cumene from propylene and benzene. Reactions in which the catalysts herein can also be used include the alkylation of cyclic compounds with olefins, the cyclic compounds including aromatics, polycyclic compounds, naphthenes and phenols; condensation reactions such as those occurring between ethers and aromatics, alcohols and aromatics, phenols and aldehydes, etc.; reactions involving the hydrohalogenation of unsaturated organic compounds, isomerization reactions; ester formation by the interaction of carboxylic acids and olefins; and the like.

What is claimed is:

1. A method of making a catalyst of the solid phosphoric acid type which comprises forming a dry mix containing from 30 to 60 weight percent $P_2O_5$ in admixture with 40 to 70 weight percent, the total being 100 weight percent, of a porous silica material selected from the group consisting of kieselguhr, infusorial earth and diatomaceous earth, forming a loose bed of individual particles of a $P_2O_5$-porous silica material, maintaining the particles in random rubbing contact with said dry mix by tumbling the particles in a bed of the dry mix, spraying the tumbling mass during the tumbling with an amount of from 75 to 115 weight percent, based on the tumbling mass, of an acid of phosphorous, tumbling the sprayed mass until spheres are formed whose average particle size is no greater than ½ inch in terms of diameter, drying the spheres, and then subjecting the spheres thus dried to steam and air at a temperature in the range of 400° F. to 750° F. and for a period of time sufficient to hydrate the $P_2O_5$ and to develop a volume of pores with diameters greater than 350 angstrom units of 0.200 to 0.400 cc. per gram, surface area of 1 to 15 square meters per gram, and a volume of pores in the range having diameters greater than 9000 angstrom units of 0.07 to 0.20 cc. per gram.

2. The process of claim 1 wherein the drying temperature is 400° F. to 800° F.

3. The process of claim 1 wherein the acid of phosphorous is orthophosphoric acid.

4. The process of claim 1 wherein the acid of phosphorous is pyrophosporic acid.

5. The process of claim 1 wherein the dry mix contains 35 to 45 weight percent $P_2O_5$.

References Cited
FOREIGN PATENTS 570,570   2/1959   Canada _____ 252—435

PATRICK P. GARVIN, Primary Examiner

U.S. Cl. X.R.

260—683.15 C